(12) United States Patent
Zhang et al.

(10) Patent No.: US 12,552,890 B2
(45) Date of Patent: Feb. 17, 2026

(54) CHIRAL AZOBENZENE POLYMER CROSSLINKED THIN FILM AND PREPARATION METHOD THEREFOR AND APPLICATION THEREOF

(71) Applicant: SOOCHOW UNIVERSITY, Suzhou (CN)

(72) Inventors: Wei Zhang, Suzhou (CN); Tengfei Miao, Suzhou (CN); Xiaoxiao Cheng, Suzhou (CN); Haotian Ma, Suzhou (CN); Zixiang He, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 315 days.

(21) Appl. No.: 18/012,598

(22) PCT Filed: Nov. 26, 2020

(86) PCT No.: PCT/CN2020/131965
§ 371 (c)(1),
(2) Date: Dec. 22, 2022

(87) PCT Pub. No.: WO2022/109959
PCT Pub. Date: Jun. 2, 2022

(65) Prior Publication Data
US 2024/0294684 A1   Sep. 5, 2024

(51) Int. Cl.
*C08L 33/14* (2006.01)
*C08F 220/36* (2006.01)
*C08J 5/18* (2006.01)
*C08J 7/12* (2006.01)

(52) U.S. Cl.
CPC .............. *C08F 220/36* (2013.01); *C08J 5/18* (2013.01); *C08J 7/12* (2013.01); *C08J 2333/14* (2013.01)

(58) Field of Classification Search
CPC .............................. C08J 2333/14; C08L 33/14
See application file for complete search history.

(56) References Cited

PUBLICATIONS

International Journal of Material Sciences; Cheng et al; 21; 6186; pp. 1-36 (Year: 2020).*

* cited by examiner

Primary Examiner — Karuna P Reddy
(74) Attorney, Agent, or Firm — SZDC Law PC

(57) ABSTRACT

Disclosed in the present invention are a chiral azobenzene polymer crosslinked thin film and preparation method therefor and application thereof. The present invention relates to a novel super-molecular chiral construction and chiral immobilization method based on an achiral side chain type azobenzene polymer thin film. According to the present invention, limonene steam is utilized to perform chiral induction on a polymer thin film at a high temperature, and then formaldehyde steam is utilized to perform acetal reaction with hydroxyl in an acidic environment to achieve crosslinking; and then differences in the stability of the super-molecular chirality of the polymer thin film before and after crosslinking is studied under the conditions of light, heat and good solvent dissolution, and the self-repairing properties of microcosmic helical chirality is researched. The crosslinked thin film prepared by the present invention has good chiral properties, and excellent solvent resistance, heat resistance, and self-repairing properties.

8 Claims, 9 Drawing Sheets

CHIRAL AZOBENZENE POLYMER CROSSLINKED THIN FILM AND PREPARATION METHOD THEREFOR AND APPLICATION THEREOF

This application is the National Stage Application of PCT/CN2020/131965, filed on Nov. 26, 2020, which is incorporated by reference for all purposes as if fully set forth herein.

TECHNICAL FIELD

The invention belongs to the technical field of supramolecular chiral fixation, relates to supramolecular chiral induction and crosslinking fixation of an achiral side chain type azobenzene random copolymer, and particularly relates to a chiral azobenzene polymer crosslinked film and a preparation method and application thereof.

BACKGROUND

In recent years, due to the good application prospects of chiral polymers in the fields of chiral recognition, photopolarization fluorescence, chiral catalysis and the like, the general attention of researchers is drawn. However, most chiral polymers obtained by directly organic synthesis methods use expensive chiral reagents, and the variety of the synthesized chiral polymers is very limited, thereby greatly restricting the development of the chiral polymers. Therefore, if the supermolecule chirality can be constructed in an achiral polymer system through a certain induction mode, the use of expensive chiral reagents and a more complicated synthesis process can be avoided, the structural range of the chiral polymer can be expanded, and the supermolecule chirality construction method has very important significance.

In the prior art, a supermolecule chiral self-assembly is based on supermolecule weak acting forces such as hydrogen bonds, pi-pi accumulation, acid-base action, metal-coordination action, subject-guest action and the like, a constructed chiral assembly has the driving force of reversible noncovalent weak interaction no matter whether a constructed element is a chiral small molecule or a polymer, the noncovalent weak interaction force has poor stability due to weak energy (generally less than 10 KJ/mol), and a chiral supermolecule ordered structure is easy to respond to external stimulation (light, heat, pH, a solvent, metal ions and the like) and even dissociates irreversibly, so that the formed chiral supermolecule structure is damaged, even irreversibly dissociated, and the application of chiral supermolecule materials is limited to a great extent.

DISCLOSURE OF INVENTION

Aiming at the situation, the invention firstly synthesizes azobenzene random copolymer with hydroxyl at the end of a side chain through a series of organic synthesis reactions and RAFT polymerization, and utilizes characterization means such as nuclear magnetism, gPC, DSC, POM, XRD and the like to carry out detailed investigation on the molecular weight and the liquid crystal performance of the polymer; then, a polymer film is prepared by a spin coating mode, and chiral limonene steam is selected to carry out chiral induction on the polymer film to obtain an optically active polymer film; the obtained chiral film is placed in the steam environment of formaldehyde and hydrochloric acid for cross-linking reaction, so that the fixation of supramolecular chirality is realized, and the defects of instability and dissociation of the traditional assembly are overcome.

Technical Solution

The specific technical scheme is as follows: the preparation method of the chiral azobenzene polymer crosslinked film comprises the following steps of preparing a side chain type azobenzene polymer into a film; then, obtaining a chiral azobenzene polymer film through the induction of a chiral reagent; and then the chiral azobenzene polymer crosslinked film is obtained through formaldehyde cross-linking.

The preparation method of the chiral azobenzene polymer film comprises the following steps of preparing a side chain type azobenzene polymer into a film; then, the chiral azobenzene polymer film is obtained through the induction of a chiral reagent. The chemical structural formula of the side chain type azobenzene polymer is as follows:

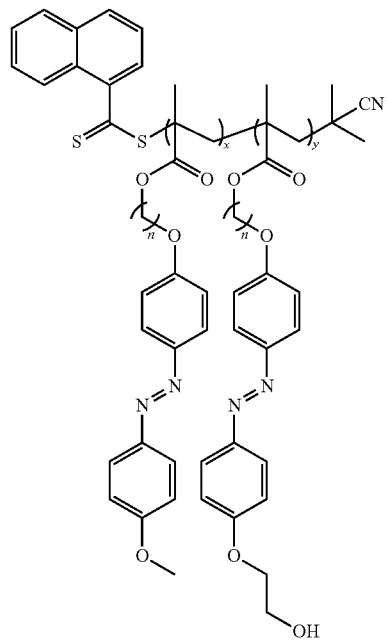

Such as:

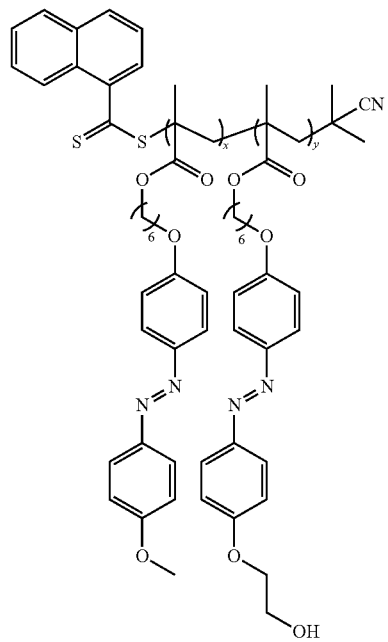

In the invention, a side chain type azobenzene polymer is prepared from a monomer, an RAFT reagent and an initiator, wherein the molar ratio of the monomer to the RAFT reagent to the initiator is 50-500:3:1, preferably 100:3:1; the monomer is Az and AzOH, preferably, the molar ratio of Az to AzOH is (0.1-10) to 1, preferably (0.5-4) to 1. In the side chain type azobenzene polymer, the ratio of x to y is 1 to (0.1-3), and n is 3-15, preferably 5-10.

Further, the initiator is selected from any one of azobisisobutyronitrile, azobisisoheptonitrile and dimethyl azobisisobutyrate, preferably azobisisobutyronitrile (AIBN); the RAFT agent comprises isobutyronitrile α-dithionaphthoate.

In the present invention, the AzOH is prepared by reacting compound A with compound B, preferably in the presence of a base and a halide under reflux conditions.

The reaction process is shown as follows, wherein the characters below the structural formula represent the name of the structural formula in the invention:

In the present invention, Az is an achiral methoxy azobenzene monomer, AzOH is an achiral hydroxy-terminated azobenzene monomer, the two react to form a random copolymer, namely an achiral side chain azobenzene polymer, after the film is prepared, a chiral solvent is used for inducing an achiral substance to generate chirality, and the method is a flexible and effective method. When the achiral molecules are wrapped by chiral molecules, the non-covalent bond between molecules, such as hydrogen bond, acid-base interaction, Van der Waals force, etc., can be used to induce the achiral substances to form a spiral arrangement, so as to realize the transfer of chirality from the chiral solvent to the achiral substances. The chiral solvent induction method of the invention is simple in operation, avoiding the complex synthesis steps of chiral polymers and the use of expensive chiral reagents.

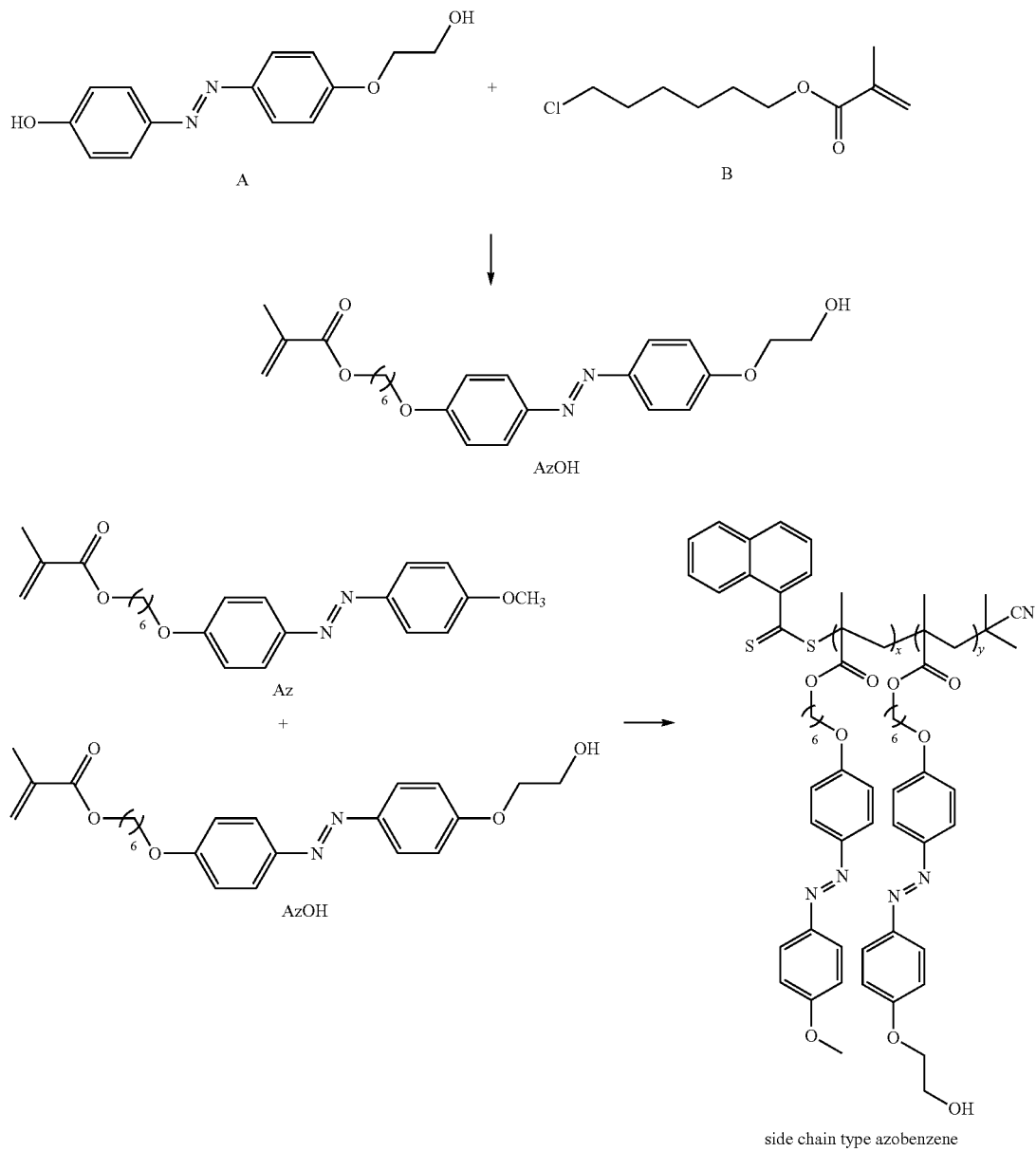

side chain type azobenzene

In the invention, a solution spin coating method is adopted to prepare the side chain type azobenzene polymer into a film.

In the invention, chiral azobenzene polymer film is obtained by adopting chiral solvent thermal induction.

In the invention, the formaldehyde crosslinking is carried out in the presence of hydrochloric acid; further, placing the chiral azobenzene polymer film above the mixture of formaldehyde and hydrochloric acid, and crosslinking to obtain the chiral azobenzene polymer crosslinked film.

The preparation method of the chiral azobenzene polymer crosslinked film specifically comprises the following steps:

1) Synthesis of Achiral Methoxy Azobenzene Monomer Az

The raw materials of methoxyaniline and concentrated hydrochloric acid were added into a deionized water solution, a sodium nitrite aqueous solution was added dropwise under an ice salt bath, and stirred for half an hour to prepare a diazonium salt aqueous solution of p-methoxyaniline;

Phenol was dissolved in deionized water, again under ice salt bath conditions, and sodium hydroxide (NaOH) and sodium bicarbonate (NaHCO) were added and mechanically stirred evenly, and then the diazonium salt solution of the p-anisidine obtained before was added dropwise; after the dropwise addition, reaction was carried out at normal temperature to obtain a khaki turbid liquid, and suction filtration was carried out, dried, recrystallized and vacuum dried on the obtained turbid liquid to finally obtain a brownish yellow compound 1;

The compound 1, potassium carbonate, potassium iodide and a solvent DMF (dimethyl formamide) were added into a 500 mL dry round-bottom flask for reflux reaction, then a halogen alcohol DMF solution was added dropwise, cooled to room temperature after overnight reaction, suction filtration was carried out to remove redundant solid, filtrate was poured into a large amount of ice water to precipitate a crude product, suction filtration was carried out to collect solid, recrystallized for further purification, and dried in vacuum to obtain a pure product, namely a compound 2;

The compound 2 and a catalyst were added into dry tetrahydrofuran, stirred under argon, and methacryloyl chloride was added dropwise under the constant temperature condition of an ice salt bath. After the addition, the reaction was kept at room temperature overnight. After the reaction, the solid was removed by suction filtration, the filtrate was collected and the solvent was spin-dried, redissolved with dichloromethane, washed with saturated sodium bicarbonate water several times and then with saturated brine. The organic phase was dried over anhydrous sodium sulfate. The solvent was dried by spinning, and the yellow solid was obtained by column chromatography. It was further recrystallized to obtain an azobenzene monomer (Az) as a terminal methoxy group as yellow crystals.

The above-mentioned halogen alcohol was selected from any one of 6-chlorohexanol, 12-bromo-1-dodecanol, 8-bromo-1-heptanol, 4-bromobutanol and 2-bromoethanol, and 6-chlorohexanol was preferred. The catalyst was selected from any one of sodium hydroxide, triethylamine, sodium bicarbonate and potassium carbonate, and triethylamine was preferred.

The reaction process was shown as follows:

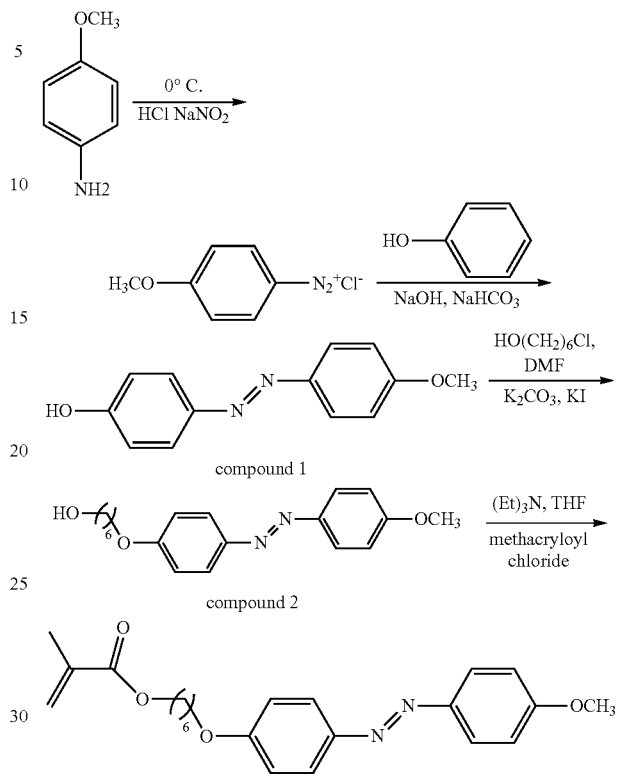

2) Synthesis of Azobenzene Monomer AzOH with the Terminal of Hydroxyl

The raw materials of p-nitrophenol, potassium carbonate and DMF were added into a 500 mL round-bottom flask, refluxed to form potassium salt, a halogen alcohol DMF solution was added for an overnight reaction, the reaction solution was poured into a large amount of water after the reaction was finished to precipitate a crude product, and further purified by recrystallization to obtain yellow crystal powder as a compound 3;

The compound 3 was added into a three-neck flask, excessive anhydrous tin dichloride was added, heated and refluxed for reaction, directly added into a large amount of ice water after the reaction was finished, and the pH value was adjusted to 7-8. Then it was extracted with ethyl acetate, washed with water, dried, and purified by spin-drying solvent column chromatography to obtain a compound A;

The raw materials of halogen alcohol and dry THF were added into a 500 mL round-bottom flask, triethylamine was added at the same time to be used as a catalyst, stirring was carried out under argon, and methacryloyl chloride was dropwise added under the constant temperature condition of an ice salt bath. After the addition, the reaction was kept at room temperature overnight. After the reaction, the solid was removed by suction filtration, the filtrate was collected and the solvent was spin-dried, redissolved with dichloromethane, washed with saturated sodium bicarbonate water several times and then with saturated brine. The organic phase was dried over anhydrous sodium sulfate. The solvent was spin-dried, and column chromatography was carried out to obtain a colorless transparent liquid as a compound B;

Finally, the compound A was added into a flask, potassium carbonate, potassium iodide and a solvent DMF were added for reflux reaction, and the compound B was dissolved in a DMF solution to be added dropwise into the solution for overnight reaction, and it was cooled to room temperature, suction filtration was carried out to remove redundant solid, the filtrate was poured into a large amount of ice water to precipitate a crude product, suction filtration was carried out to collect the solid, recrystallized for further purification, and vacuum drying was carried out to obtain a pure product, namely the azobenzene monomer (AzOH) with the terminal of hydroxyl.

The halogen alcohol was selected from any one of 3-bromopropanol, 4-bromobutanol and 6-chlorohexanol, and 6-chlorohexanol was preferred.

The reaction process was shown as follows:

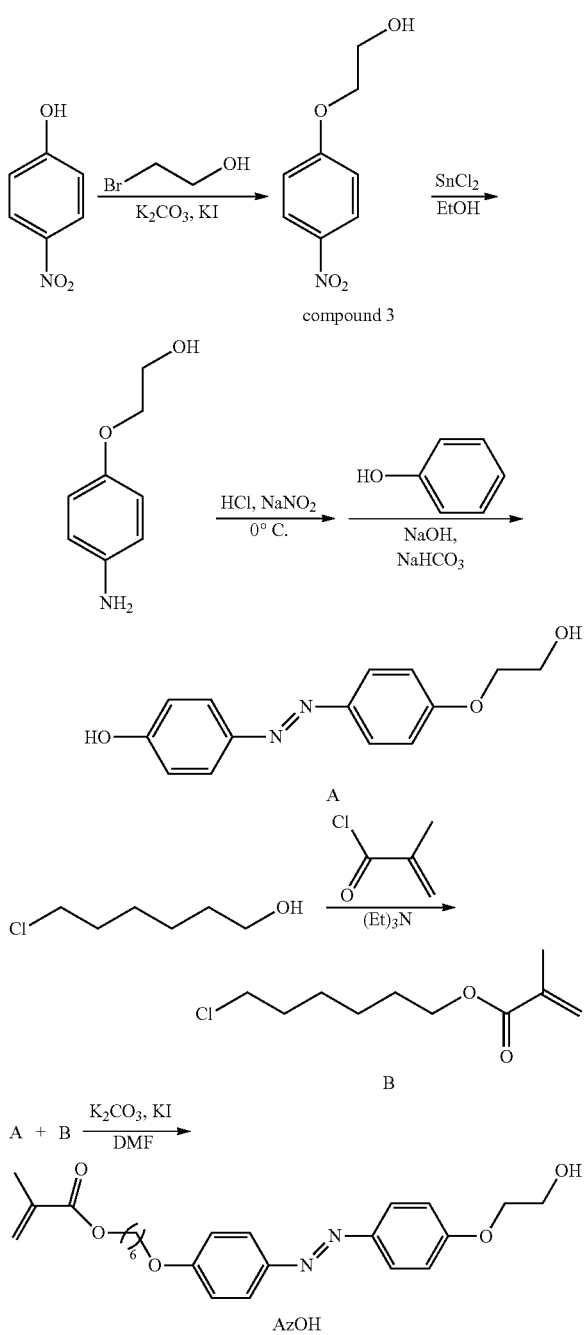

3) Synthesis of Achiral Side-Chain Azobenzene Homopolymer and Random Copolymer

The monomer Az obtained in the step 1), the monomer AzOH obtained in the step 2), a RAFT reagent alpha-isobutyronitrile dithionaphthoate (CPDN), an initiator azobisisobutyronitrile (AIBN) and a solvent were added into a reaction vessel, deoxidized with inertgas, and polymerized under a heating condition for 1-8 hours. The reaction was stopped to obtain an achiral side chain type azobenzene polymer ($PAZ_x$-r-$AzOH_y$). Wherein the total molar amount of the two monomers and the molar ratio of the RAFT reagent to the initiator are 50-500:3:1, and preferably 100:3:1.

The solvent was selected from Tetrahydrofuran (THF), dimethyl sulfoxide (DMSO), N-Dimethylformamide (DMF), and anisole, preferably anisole. The inert gas was selected from any one of argon, nitrogen, helium and neon, and preferably argon.

4) Preparation of Achiral Azobenzene Polymer Film and Induction of Chiral Steam

A polymer was weighed, and dissolved in an organic solvent to prepare a polymer solution. A clean thin quartz plate was taken and placed in a rotary film coating machine for sucking and fixing the quartz plate, a small amount of polymer solution was sucked by using a liquid-transferring gun to slowly drip the polymer solution on the surface of the quartz plate, and a spin coating machine was turned on to start film coating. And after the spin coating was finished, the film was placed in a vacuum oven for vacuum heating and annealing treatment. And the test piece was taken out after the test was finished, and placed in a dark place for testing.

The annealed polymer film was suspended in a closed cuvette, a chiral solvent was added and placed at the bottom of the cuvette, and it was heated and cooled to obtain the chiral azobenzene polymer film, then it was taken out and dried, and placed in a dark place for testing.

The organic solvent for dissolving the polymer was selected from Tetrahydrofuran (THF), N-Dimethylformamide (DMF), and chloroform (CHCl) and Tetrahydrofuran (THF) was preferred. The coating condition was that after low-speed glue homogenizing, high-speed glue homogenizing was carried out, for example, the low-speed glue homogenizing was carried out for 6s, the rotating speed was 0.5 kr/min, the high-speed glue homogenizing was carried out for 20s, and the rotating speed was 1.9 kr/min. The chiral solvent was selected from one of chiral limonene, chiral carvone, chiral sec-butyl alcohol and chiral sec-octyl alcohol, and preferably chiral limonene.

5) Supramolecular Chiral Thin Film Crosslinking

A formaldehyde solution and a hydrochloric acid solution were poured into a beaker, the chiral azobenzene polymer film after chirality induction was suspended above the liquid level, and the whole system was placed in a dark place for reaction. And the film was taken out after the reaction was finished, washed with water to remove residual hydrochloric acid and formaldehyde, dried to obtain the chiral azobenzene polymer crosslinked film, and the film was placed in a dark place for testing.

After completion of each of the above-mentioned processes, purification steps can be carried out to obtain the product with higher purity and including, and the purification steps include but not limited to chromatography, dissolution/precipitation separation, filtration, etc.

The invention introduces active groups which can be crosslinked or polymerized on small molecules or polymer structures, and crosslinks and fixes supermolecule chiral structures under specific conditions, so that the covalent bond is more important to fix the assembly, and the problem that the existing assembly formed by non-covalent bond cannot be stabilized is solved.

Beneficial Effects

In the prior art, a method for fixing an original structure of an assembly by utilizing a covalent bond is similar to a coumarin method, a styrene crosslinking method, a cinnamic acid method, a diacetylene crosslinking method and the like, however, ultraviolet illumination is usually used as an initiating means of a crosslinking reaction in the method, or a larger crosslinking reaction group needs to be introduced into the structure, so that on one hand, the difficulty of supramolecular chiral construction is increased, and in an azobenzene polymer system, 365 nm ultraviolet illumination easily causes cis-trans isomerization to destroy the assembly structure. The invention discloses an azobenzene polymer structure with a hydroxyl at the terminal end of a side chain and performs chiral induction for the first time, a cross-linked microstructure fixing technology is applied to the field of chiral supermolecules for the first time, cross-linking is utilized, conditions are mild, the use of a group which is relatively rigid and large in volume is avoided, the successful induction of supermolecule chirality is improved, and supermolecule chiral fixation is realized in a polymer system; after the crosslinking reaction, the one-dimensional characteristic of the polymer main chain can be kept, and the polymer chain can also keep the orientation when being irradiated by UV light or heated at high temperature, so that the preparation method has the advantages of simplicity, high efficiency and the like.

DRAWINGS

EXAMPLES OF THE INVENTION

Figure 1:
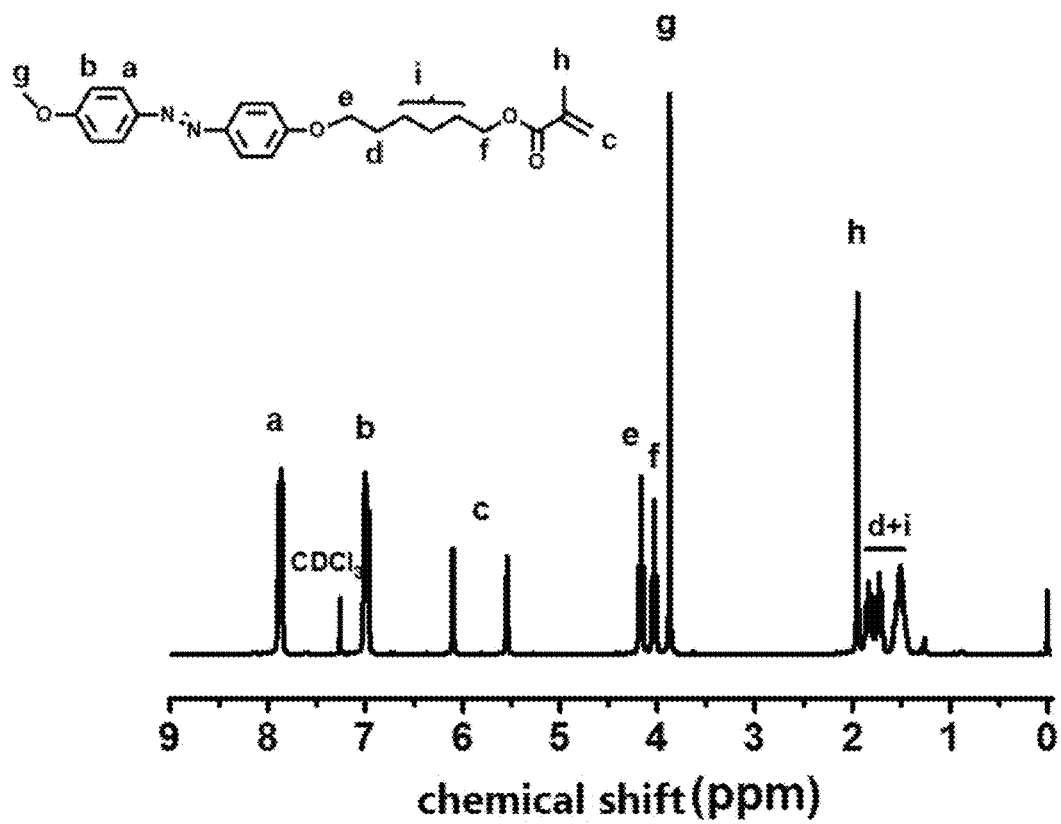
FIG. 1 is a nuclear magnetic image of an achiral monomer Az.

Testing instruments and conditions: H nuclear magnetic resonance (1H-NMR): a Bruker 300 MHz NMR spectrometer was used, and $CDCl_3$ and $DMSO-d_6$ were used as solvent, TMS was used as internal standard, copolymer nuclear magnetism was measured at high temperature, and the rest was measured at room temperature.

Gel Permeation Chromatography (GPC): A gel permeation chromatograph with TOSOH TSKgel SuperHM-M was used for molecular weight and molecular weight distribution, which was an automatic feeding model, polymethyl methacrylate (PMMA) was used as a standard to calculate the molecular weight of the polymer, N, N-Dimethylformamide (DMF) was used as a mobile phase at a flow rate of 0.65 mL/min and a temperature of 40° C.

Ultraviolet-visible absorption spectrum: the ultraviolet absorption signal was measured by using a UV-2600 ultraviolet-visible absorption spectrometer produced by Nippon Jinshima, and the scanning range is 250-600 nm.

Circular dichroism (CD): it was measured on a J-815 circular dichrograph (JASCO, (Hachioji, Tokyo, Japan)) with a Peltier temperature control assembly to control the measured temperature. The scanning speed was 200 nm/min, the scanning range was 250-600 nm, and the bandwidth was 2 nm.

Differential Scanning calorimeter (DSC): TA DSC 250 was used, and the first temperature rise and fall rate is 20° C./min, the second temperature rise and fall rate is 10° C./min.

Polarizing microscope (POM): the test was performed using a CNOPTEC BK-POL polarizing microscope, equipped with a (Linkam THMS 600) hot stage.

Small angle X-ray scattering (SAXS): an Anton Paar SAXSess MC2 diffractometer, Cu Kα radiation source, wavelength 0.154 nm was used.

Wide angle X-ray diffraction (WAXD): an X-ray diffractometer from Bruker D8 ADVANCE, Cu ka radiation source, wavelength 0.154 nm was used.

X-ray diffraction photoelectron spectroscopy (XPS): the change in binding energy of the polymer film before and after crosslinking was examined by photoelectron spectroscopy of Thermo Fisher Scientific ESCALAB 250 XI.

The temperature rise and fall treatment in the Examples was carried out by raising the temperature to 100° C. at 10° C./min and then lowering the temperature to room temperature after 20 seconds.

Synthesis Examples

1) Synthesis of Achiral Methoxy Azobenzene Monomer

The raw material methoxyaniline (12.32 g, 0.1 mol) and concentrated hydrochloric acid were added into deionized water solution (80 mL), magnetically stirred for 0.5 h under ice salt bath, and 30 mL $NaNO_2$ (7 g, 0.1 mol/L) aqueous solution was added dropwise, and after the dropwise addition, the reaction was continued for 0.5 h under an ice salt bath to prepare a diazonium salt aqueous solution, wherein the system was red.

Phenol (16 g, 0.15 mol), NaOH (8 g, 0.2 mol) and $NaHCO_3$ (8.4 g, 0.1 mol) were dissolved in 50 mL deionized water, the mixture was mechanically stirred under the condition of ice salt bath (the temperature is controlled to be 0-5° C.), and then the diazonium salt solution of the p-anisidine obtained before was added dropwise into the phenol solution, the condition of the ice salt bath was still needed to be maintained, and the solution gradually changed from colorless to yellow and finally changed to tan. After the dropwise addition, it was reacted at room temperature for 4 h to obtain a khaki suspension, which was filtered and washing with water to remove salt impurities, dried, recrystallized with ethanol, and vacuum dried to finally obtain the tan compound 1 (14.78 g, 64.84%).

A 500 mL dry round bottom flask was filled with the compound 1 (12.0 g, 52.6 mmol), potassium carbonate (29.0 g, 0.21 mol) and DMF solvent (150 mL) at 80° C. for refluxing for 30 min, magnetically stirred for 30 min, and 20 mg of KI as a catalyst was added after the solid was completely dissolved. Then hexachlorohexanol DMF solution (10.5 mL in volume, diluted with 10 mL of DMF) was added dropwise to the above solution, reacted for 18 hours and cooled to room temperature, filtered to remove excessive solids, the filtrate was poured into a large volume of ice water to precipitate the crude product, which was collected by suction filtration and further purified by ethanol recrystallization, and dried in vacuum to obtain the pure product compound 2 (11.15 g, 64.6%).

The compound 2 (5.0 g, 15.24 mmol), triethylamine (25 mL) were added to dry tetrahydrofuran (100 mL), cooled in an ice salt bath and stirred under argon atmosphere for 30 min. Methacryloyl chloride (2.5 g, 24.0 mmol) was diluted with anhydrous tetrahydrofuran and added dropwise to the above solution, maintaining the temperature in an ice salt bath. After the dropwise addition, the reaction was kept at room temperature, and TLC was used to track the reaction progress. After the reaction, the solid was removed by suction filtration, the filtrate was collected and the solvent was spin-dried, redissolved with dichloromethane, washed with saturated sodium bicarbonate water several times and then with saturated brine. The organic phase was dried over anhydrous sodium sulfate. The solvent was dried by spinning, and the yellow solid was obtained by column chromatography. And it was further purified by ethanol recrystallization to obtain the azobenzene monomer (Az) (4.23 g, 70.2%) with terminal of methoxygroups as yellow crystals.

2) Synthesis of Azobenzene Monomer with Terminal of Hydroxy

The raw materials p-nitrophenol (6.95 g, 50.0 mmol), potassium carbonate (27.6 g, 200.0 mmol) and 150 mL DMF were added to a 500 mL round bottom flask at 80° C. for refluxing for 6 hours under to form potassium salt. 2-Bromoethanol (9.38 g, 75.0 mmol) dissolved in DMF (50 mL) was added to the mixture. After 20 hours of reaction, the reaction mixture was poured into a large amount of water, and the crude product was precipitated and further purified by ethanol recrystallization to obtain the compound 3 (5.58 g, 80.2%) as a yellow crystalline powder.

The above compound 3 (5.49 g, 30 mmol) was charged into a three-necked flask, and anhydrous ethanol (50 mL) and then an excessive amount of anhydrous tin dichloride (67.5 g, 300 mmol) were added thereto, followed by heating under reflux to react for 3 hours. After the reaction was completed, the reaction mixture was directly added to a large amount of ice water, and the pH was adjusted to 7.5 with potassium carbonate. Then it was extracted with ethyl acetate, washed with water, dried, and purified by spin-drying solvent column chromatography to obtain the compound 4 (4.32 g, 78.7%).

A 500 mL round bottom flask was filled with hexachlorohexanol (5.0 g, 36.6 mmol) and dry THF (100 mL) while triethylamine (12 mL, 86.3 mmol) was added as a catalyst, stirred under argon for 30 min, and methacryloyl chloride (7.6 g, 73.1 mmol) was added dropwise at constant temperature to the ice-salt bath. After the addition, the reaction was kept at room temperature for 20 hours. After the reaction, the solid was removed by suction filtration, the filtrate was collected and the solvent was spin-dried, redissolved with dichloromethane, washed with saturated sodium bicarbonate water for 3 times and then with saturated brine. The organic phase was dried over anhydrous sodium sulfate. The solvent was dried by spinning, and subjected to column chromatography to obtain the compound 5 (6.02 g, 80.6%) as a colorless transparent liquid.

Finally, the compound 4 (3.0 g, 11.6 mmol) was added to the flask, potassium carbonate (6.4 g, 46.5 mmol), 30 mg KI and solvent DMF (35 mL) were added at 80° C. for refluxing for 30 min. Then, a certain amount of compound 5 (3.21 g, 15.7 mmol) was dissolved in DMF solution and added dropwise to the above solution, after reacting for 15 hours, cooled to room temperature, filtered to remove excessive solid, the filtrate was poured into a large amount of ice water to precipitate a crude product, filtered to collect solid, recrystallized from ethanol for further purification, and dried under vacuum to obtain pure product, i.e., azobenzene monomer with the terminal of hydroxyl (AzOH) (3.62 g, 73.3%).

Figure 2:
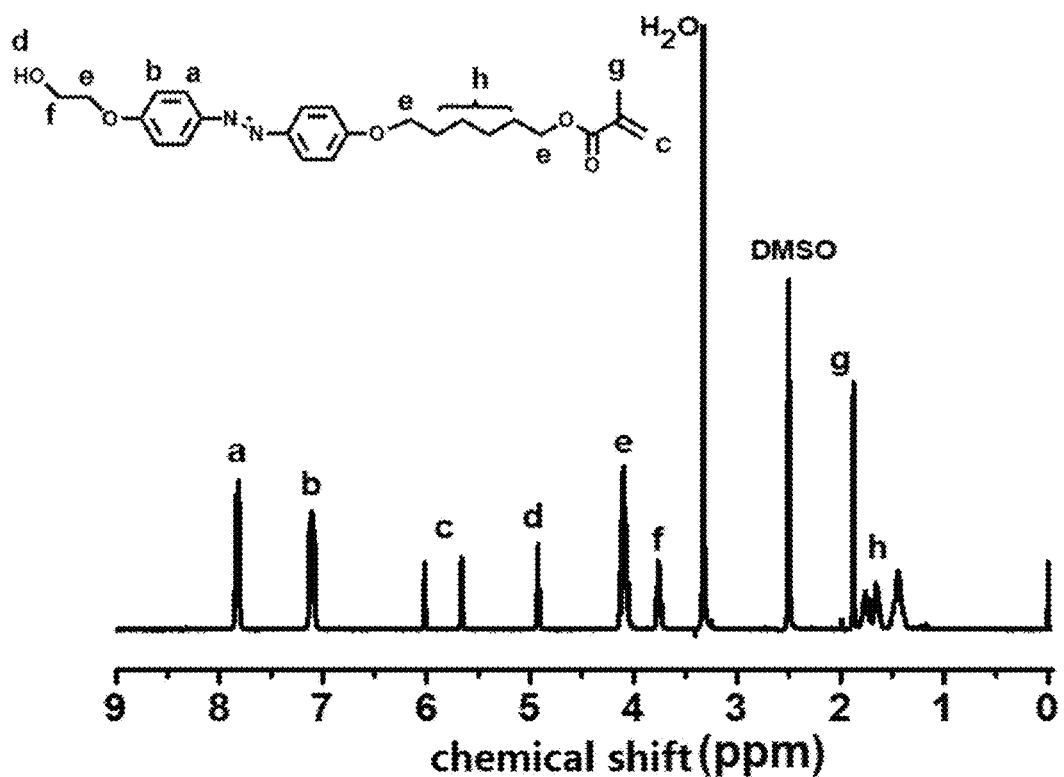
FIG. 2 is a nuclear magnetic image of achiral monomer AzOH.

FIG. 1 is a nuclear magnetic image of the achiral monomer Az, wherein the nuclear magnetic peak corresponds to the monomer, and no hetero-peak is present, indicating that the monomer is relatively pure. FIG. 2 is a nuclear magnetic image of the achiral monomer AzOH, wherein the nuclear magnetic peak corresponds to the monomer, and no hetero-peak is present, indicating that the monomer is relatively pure.

3) Synthesis of Achiral Side-Chain Azobenzene Homopolymer and Random Copolymer

The monomer Az obtained in step 1), monomer AzOH obtained in step 2), and RAFT reagent alpha-diIsobutyronitrile ester of thionaphthoic acid (CPDN) (8.08 mg, 0.029 mmol), azobisisobutyronitrile (AIBN) (1.64 mg, 0.010 mmol), solvent anisole (1.5 mL) were added to a 5 mL ampoule, the ratio of total molar monomer to RAFT reagent, initiator was 100:3:1. And after the sample addition was finished, freezing-air extraction-inflation-unfreezing circulation was carried out for three times by using the double-row pipe to remove oxygen, the bottle mouth was sealed after the completion, and it was heated and stirred at the temperature of 70° C. for reaction for 3 hours. The polymerization took place under heating for 3 h. The reaction was stopped, the reaction mixture was diluted with 2 mL of THF, precipitated twice in methanol, and the solid was collected to obtain an achiral side-chain azobenzene polymer ($PAZ_x$-r-$AzOH_y$).

When the monomer was only the monomer AzOH obtained in the step 2), the rest was unchanged, and the obtained polymer was PAZOH; when the monomer Az obtained in step 1) was the only monomer, the rest was unchanged, and the polymer obtained was PAz.

According to different molar feeding ratios of the monomer Az and the monomer AzOH, homopolymerized polymers and copolymerized polymers could be obtained.

Figure 3:
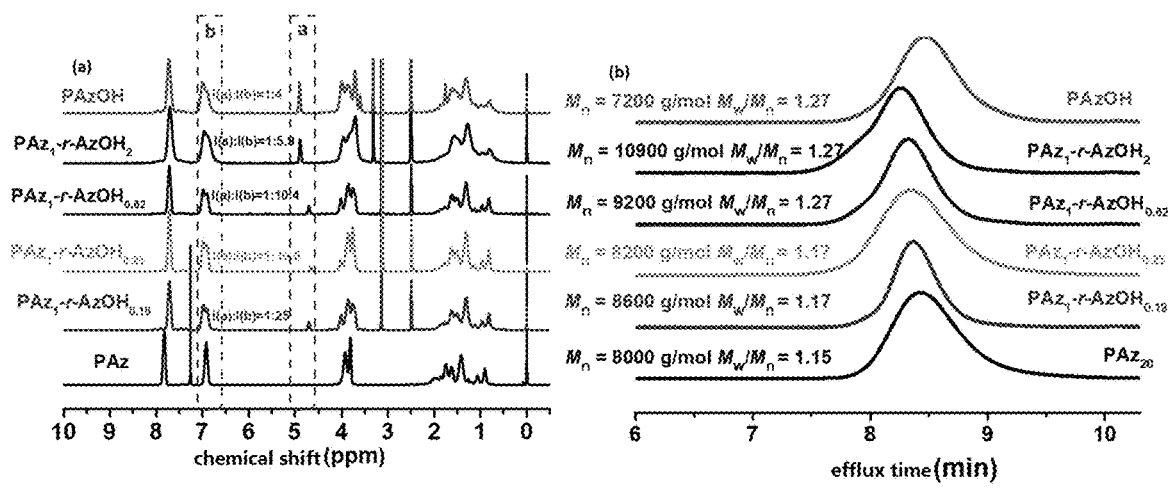
FIG. 3 is a nuclear magnetic image andgPC outflow curve for different polymers.
Figure 4:
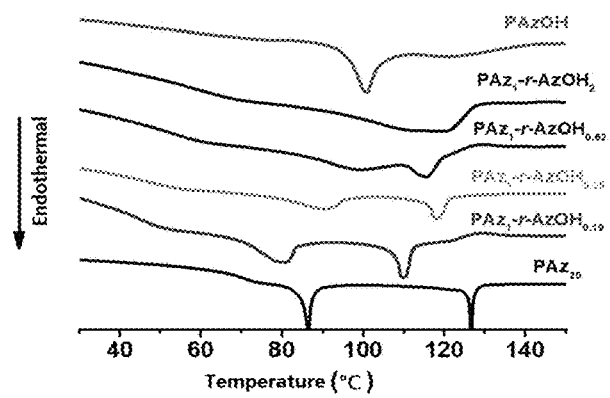
FIG. 4 is a DSC curve for different polymers.
Figure 5:
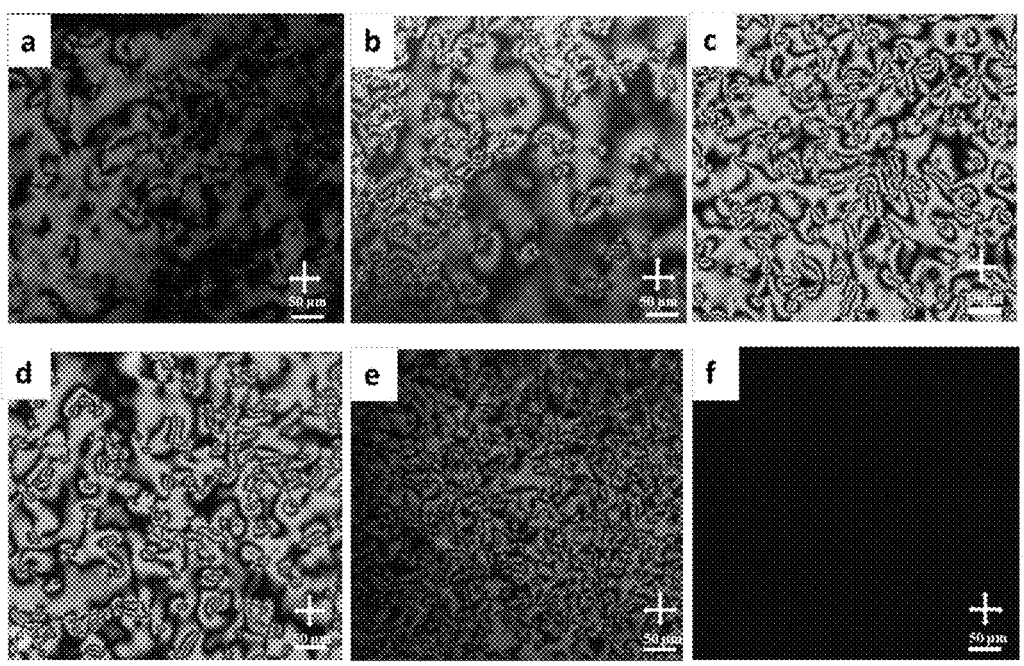
FIG. 5 is a polarization microscope (POM) photograph of different polymers.
Figure 6:
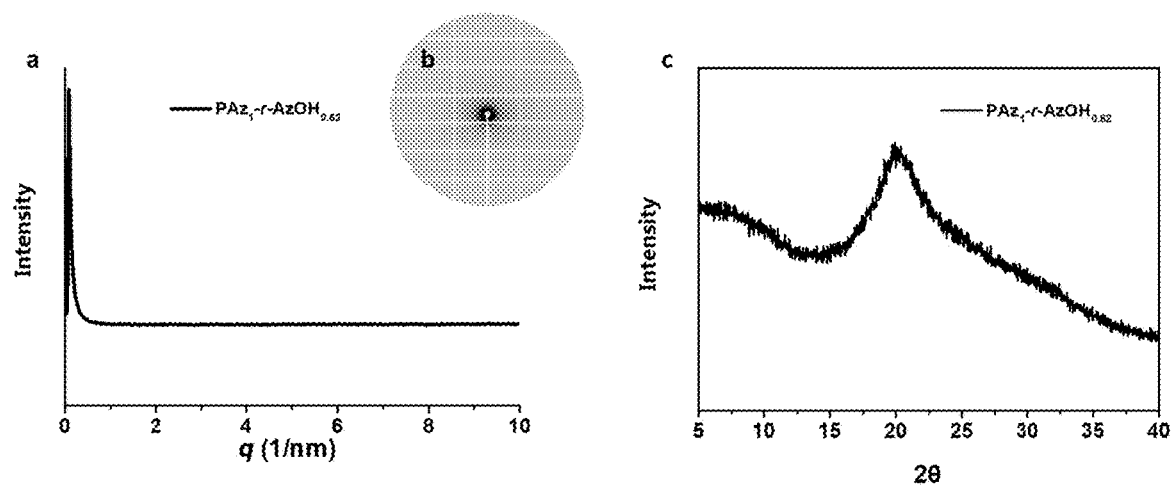
FIG. 6 is a plot of small angle X-ray scattering and wide-angle X-ray diffraction for a polymer.

FIG. 3 shows the nuclear magnetic image and gPC outflow curve of different polymers, and the ratio of two monomers in the copolymer was obtained by comparing the peak of hydroxyl in nuclear magnetic spectrum with the peak of hydrogen on benzene ring of azobenzene. FIG. 4 is a DSC curve of different polymers. FIG. 5 shows a photograph taken by a polarizing microscope (POM) of different polymers, wherein the polymer solid powder was heated to a temperature exceeding the transition temperature of the clearing point, and then slowly cooled to a temperature range of the liquid crystal phase, and the results were shown in the following order: PAZ, $PAZ_1$-r-$AzOH_{0.19}$, $PAZ_1$-r-$AzOH_{0.25}$, $PAZ_1$-r-$AzOH_{0.62}$, $PAZ_1$-r-$AzOH_2$, PAZOH. FIG. 6 shows the small-angle X-ray scattering and wide-angle X-ray diffraction patterns of the copolymer under the same conditions as those of POM. The nematic liquid crystal structure of the polymer was determined by FIGS. 4, 5 and 6, and the direct liquid crystal cell pitch was about 0.44 nm as calculated by the Bragg equation.

Table 1 shows the charge ratio, molecular weight and hydroxyl content of different polymers.

TABLE 1

Table 1 the charge ratio, molecular weight and hydroxyl content of different polymers

| Entry | Ratio$^a$ | Conv.$^b$ (%) | Monomer-ratio$^c$ (Az:AzOH) | $M_{n(GPC)}{}^d$ (g mol$^{-1}$) | $M_w/M_n{}^e$ |
|---|---|---|---|---|---|
| PAZ | 100:0:3:1 | 67.2 | 1:0 | 8000 | 1.15 |
| PAZ$_1$-r-AzOH$_{0.19}$ | 80:20:3:1 | 65.8 | 1:0.19 | 8600 | 1.17 |
| PAZ$_1$-r-AzOH$_{0.25}$ | 71.5:28.5:3:1 | 63.2 | 1:0.25 | 8200 | 1.17 |
| PAZ$_1$-r-AzOH$_{0.62}$ | 50:50:3:1 | 55.7 | 1:0.62 | 9200 | 1.27 |
| PAZ$_1$-r-AzOH$_2$ | 33:66:3:1 | 53.7 | 1:2 | 10900 | 1.27 |
| PAzOH | 0:100:3:1 | 46.7 | 0:1 | 7200 | 1.27 |

$^a$polymerizationdegree: [Az]$_0$/[AzOH]$_0$/[CPDN]$_0$/[AIBN]$_0$.
$^b$Yield determined by weighing method.
$^c$ Calculated by the following method: Az:AzOH (in the molecular chain) = 1:(4/(I(b) − 4 × I(a))).
$^{d,e}$in GPC using DMF as solvent, PMMA is calculated by internal standard.

EXAMPLES

Preparing an Achiral Azobenzene Polymer Film and Preparing the Chiral Azobenzene Polymer Film by Chiral Steam Induction The polymer was weighed and dissolved in THF to prepare a 12 mg/mL polymer solution (clear solution). A clean thin quartz piece was taken and placed in a rotary film coating machine for sucking and fixing, and the rotating speed and time of low-speed glue homogenizing and high-speed glue homogenizing were adjusted. 1 mL of polymer solution was sucked up by using a liquid-transferring gun to be added dropwise to the surface of a quartz piece, then a spin coater was turned on to start coating to uniformly coat at a low speed for 6 s and a rotating speed of 0.5 kr/min and then at a high speed for 20s and a rotating speed of 1.9 kr/min; after the spin coating was finished, the film was placed in a vacuum oven to be heated for 12 hours at the temperature of 110° C. in vacuum, and annealing treatment was carried out. And the test piece was taken out after the process, and placed in a dark place for testing.

The annealed polymer film was suspended in a closed cuvette, and chiral limonene was added and placed on the bottom of the cuvette (not contacting the film), heated to 93° C. and maintained for 5 minutes, naturally cooled to obtain a chiral azobenzene polymer film, which was taken out and dried and placed in a dark place for testing.

Figure 7:
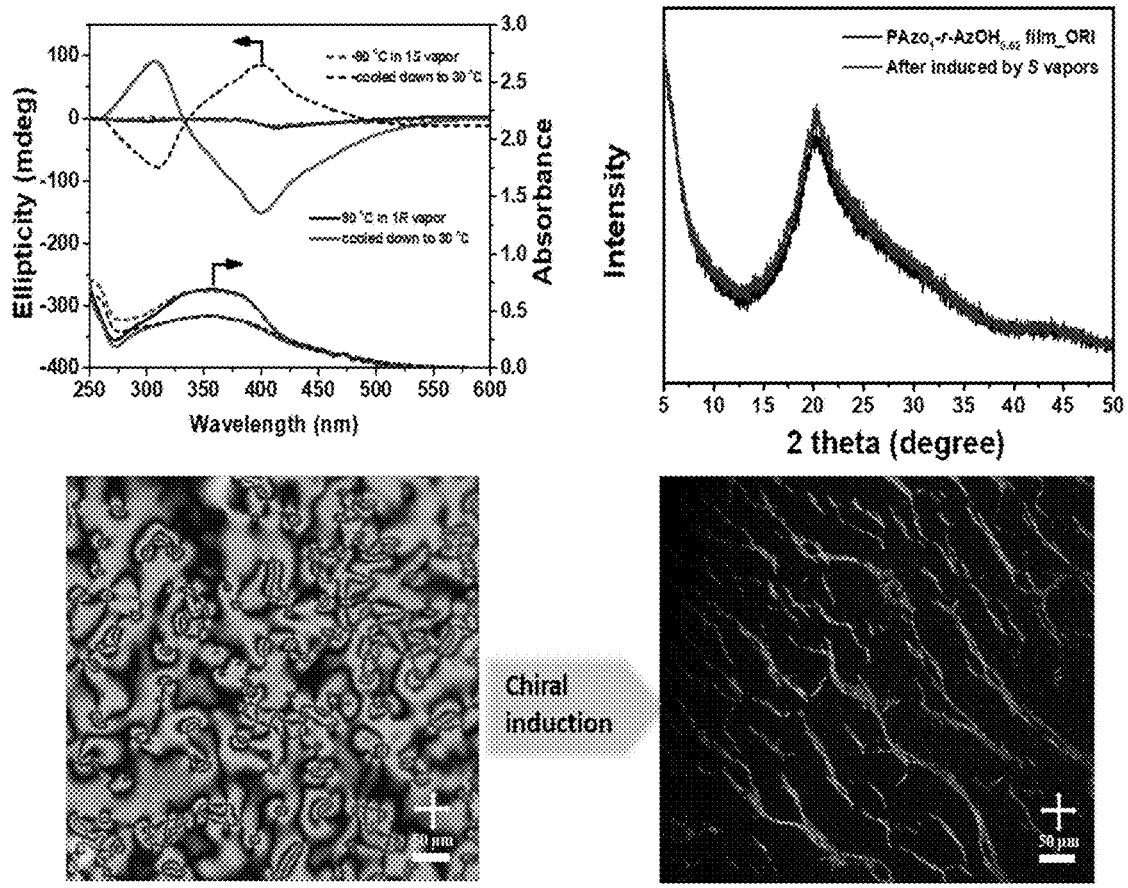
FIG. 7 is a CD spectrum, UV spectrum, POM and XRD pattern of the polymer film before and after induction.
Figure 8:
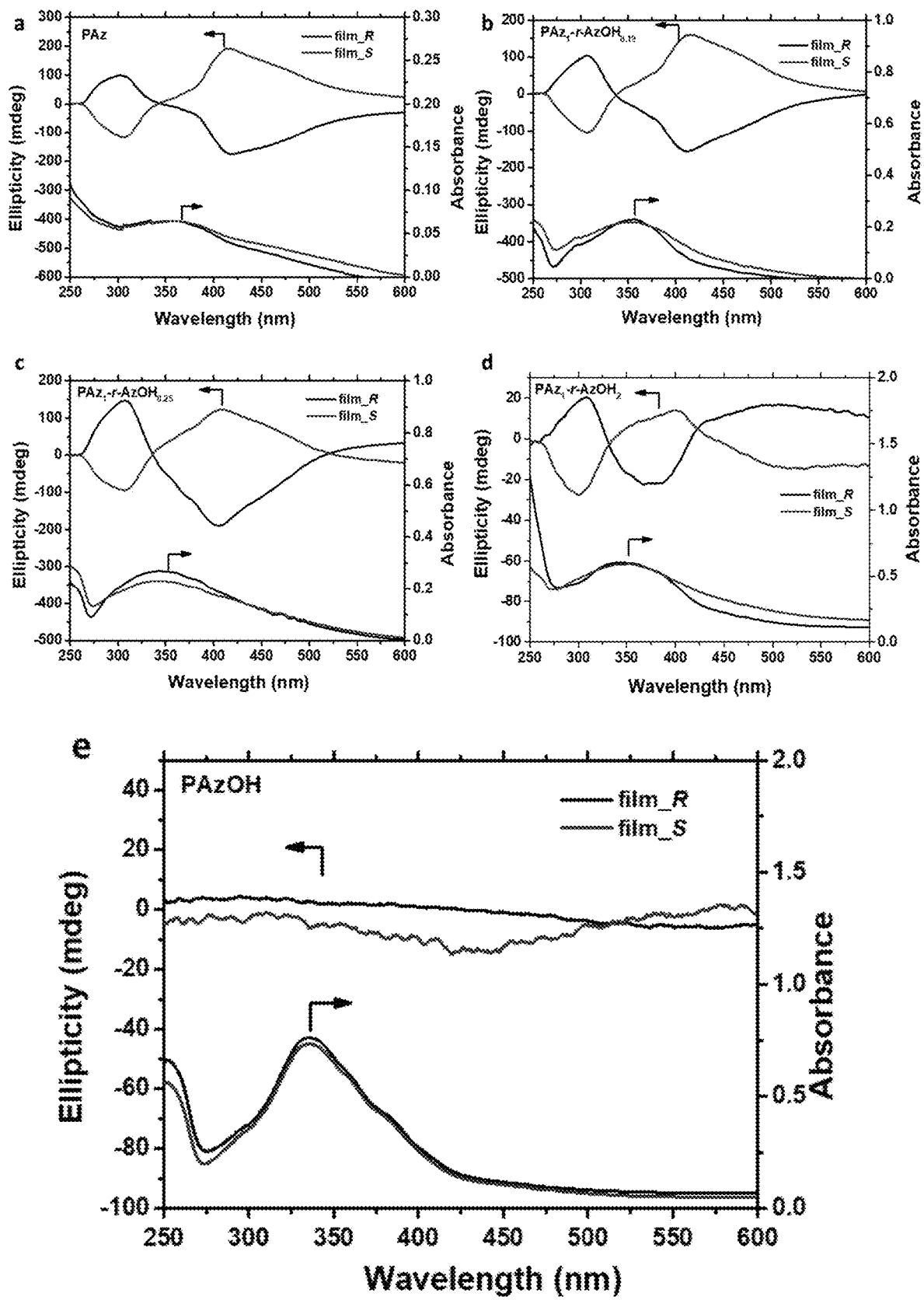
FIG. 8 shows the chiral expression of copolymer films with different hydroxyl contents.
Figure 9:
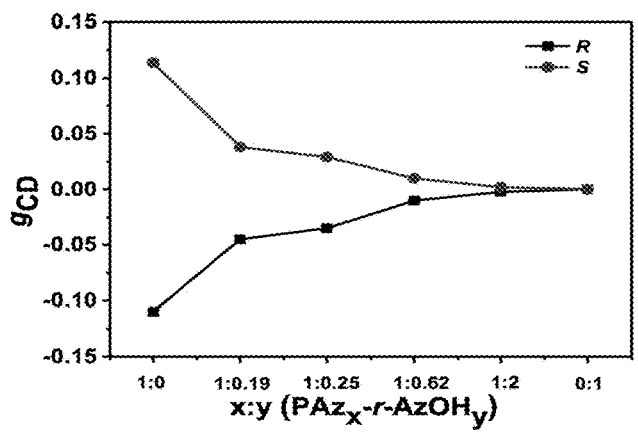
FIG. 9 is agDA spectrogram of a copolymer film with different hydroxyl contents.

FIG. 7 shows CD spectra, UV spectra, POM and XRD patterns before and after induction of the polymer film, and shows that the polymer film formed a Chiral Nematic phase (Chiral Nematic) by fumigation with high temperature chiral vapor through the above tests. FIG. 8 shows the chiral expression of different copolymer films, and from the CD spectrum, the chiral signal intensity obtained by the copolymer gradually changed with different monomer ratios. FIG. 9 shows gCD spectra of different copolymer films, and the calculation method forgCD is [ellipticity/32980]/absorbance.

Cross-Linking Preparation of Chiral Azobenzene Polymer Cross-Linked Film by Supermolecule Chiral Film The formaldehyde solution and the hydrochloric acid solution were poured into a beaker. The film after chiral induction was suspended above the liquid level, and the whole system was sealed in a dark place for 24 hours; and the film was taken out after the reaction was finished, washed with water to remove residual hydrochloric acid and formaldehyde, dried to obtain the chiral azobenzene polymer crosslinked film to be placed in a dark place for testing.

Figure 10:
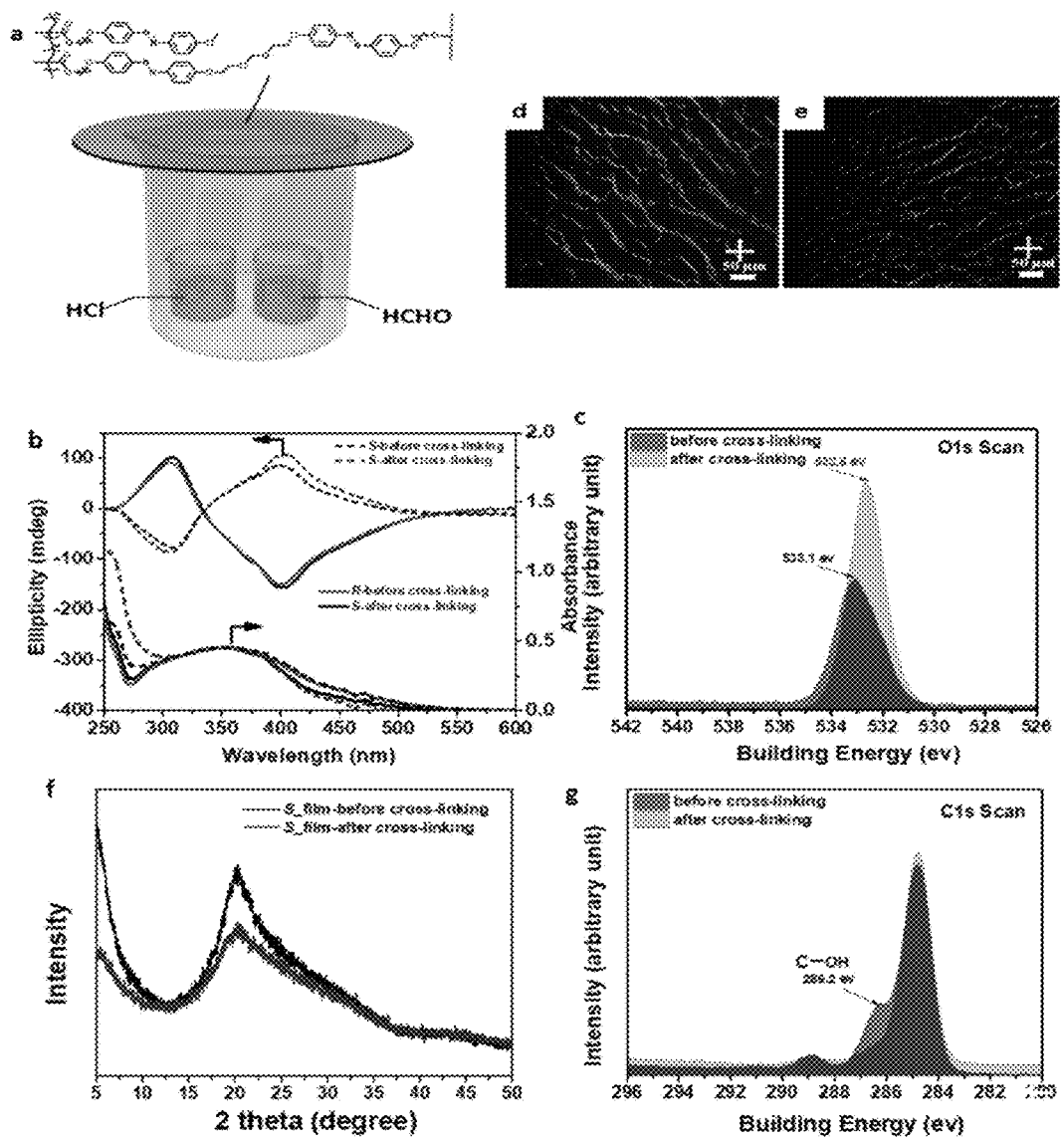
FIG. 10 is crosslinking process of copolymer $PAZ_1$-r-$AzOH_{0.62}$ chiral film.

FIG. 10 is the cross-linking process of the copolymer PAZ$_1$-r-AzOH$_{0.62}$ chiral thin film. FIG. 10 (a) is a schematic diagram of a cross-linking reaction apparatus; FIG. 10 (b) is the CD spectrum change before and after crosslinking, from which it can be seen that the supramolecular chirality of the polymer film remained after crosslinking; FIGS. 10 (c), (g) are narrow scan spectra in XPS of elemental oxygen and elemental carbon before and after crosslinking, wherein a shift in binding energy corresponding to hydroxyl oxygen and a disappearance of binding energy of carbon adjacent to hydroxyl indicates that the crosslinking reaction was almost complete; it can be seen from FIGS. 10 (d)-(f) that the chiral nematic phase structure remained after crosslinking, and the diffraction peak at the wide XRD angle decreased after crosslinking.

Figure 11:
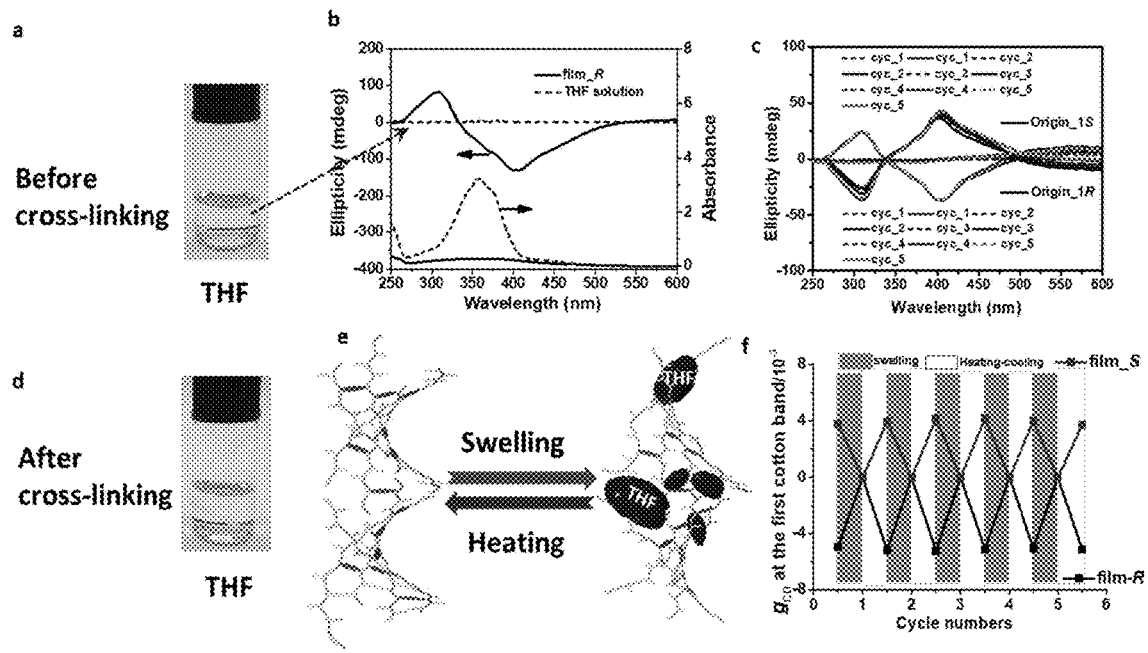
FIG. 11 shows the investigation of solvent resistance of copolymer $PAZ_1$-r-$AzOH_{0.62}$ chiral film before and after crosslinking.

FIG. 11 shows the investigation of solvent resistance of copolymer PAZ$_1$-r-AzOH$_{0.62}$ chiral film before and after crosslinking, and solvent THF of the polymer before crosslinking was selected as an object to be investigated. It can be seen from FIG. (a) and (d) that the solubility of the film before and after crosslinking was substantially changed, the polymer film before crosslinking was very soluble in THF, and the solution did not show CD signal (FIG. 11 (b)), and the polymer film after crosslinking was insoluble in THF, and the CD signal could be restored to its original intensity only by a rapid temperature increase and decrease treatment (decrease the temperature to room temperature after heating up to 100° C. for 20 seconds) without chiral source as shown in FIG. 11 (c)-(f). Homopolymer PAz chiral film remained readily soluble in THE after the same cross-linking treatment.

PAz-r-AzOH polymer chiral cross-linked film of the same size was taken and placed together in THF to be taken out after 30 minutes, heated to 100° C. at the rate of 10° C./min, cooled to room temperature after 20s. And the swelling change of the film was observed through a spectrum, wherein it shows that all the films were not dissolved and the CD signal of the PAZ$_1$-r-AzOH$_{0.62}$ chiral cross-linked film did not change before and after swelling-rapid temperature rise and drop, and the CD spectrum could be restored to the initial signal intensity, and the CD signals of PAZ$_1$-r-AzOH$_{0.25}$, PAZ$_1$-r-AzOH$_2$ decreased after swelling-rapid temperature rise and drop and the CD signal of PAZ$_1$-r-AzOH$_2$ decreased more significantly than that of PAZ$_1$-r-AzOH$_{0.25}$.

Figure 12:
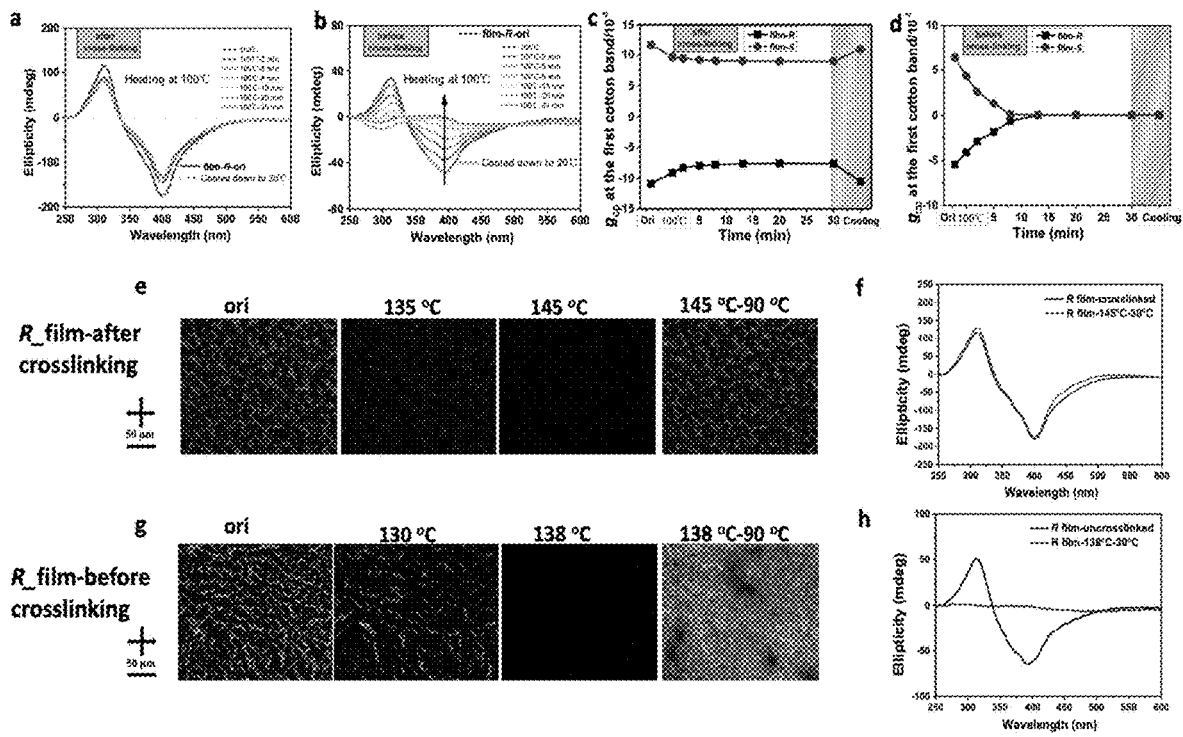
FIG. 12 shows the investigation of heat resistance of copolymer $PAZ_1$-r-$AzOH_{0.62}$ chiral film before and after crosslinking.

FIG. 12 shows the investigation of heat resistance of copolymer PAZ$_1$-r-AzOH$_{0.62}$ chiral film before and after crosslinking. From FIGS. (a)-(d), it can be seen that the film before and after crosslinking showed significant differences in the signal stability at 100° C., and it can be seen that both the film texture and CD after crosslinking had good recovery performance from the POM testing of cooling after heating to clearing point, as shown in FIG. 12e,g.

Figure 13:
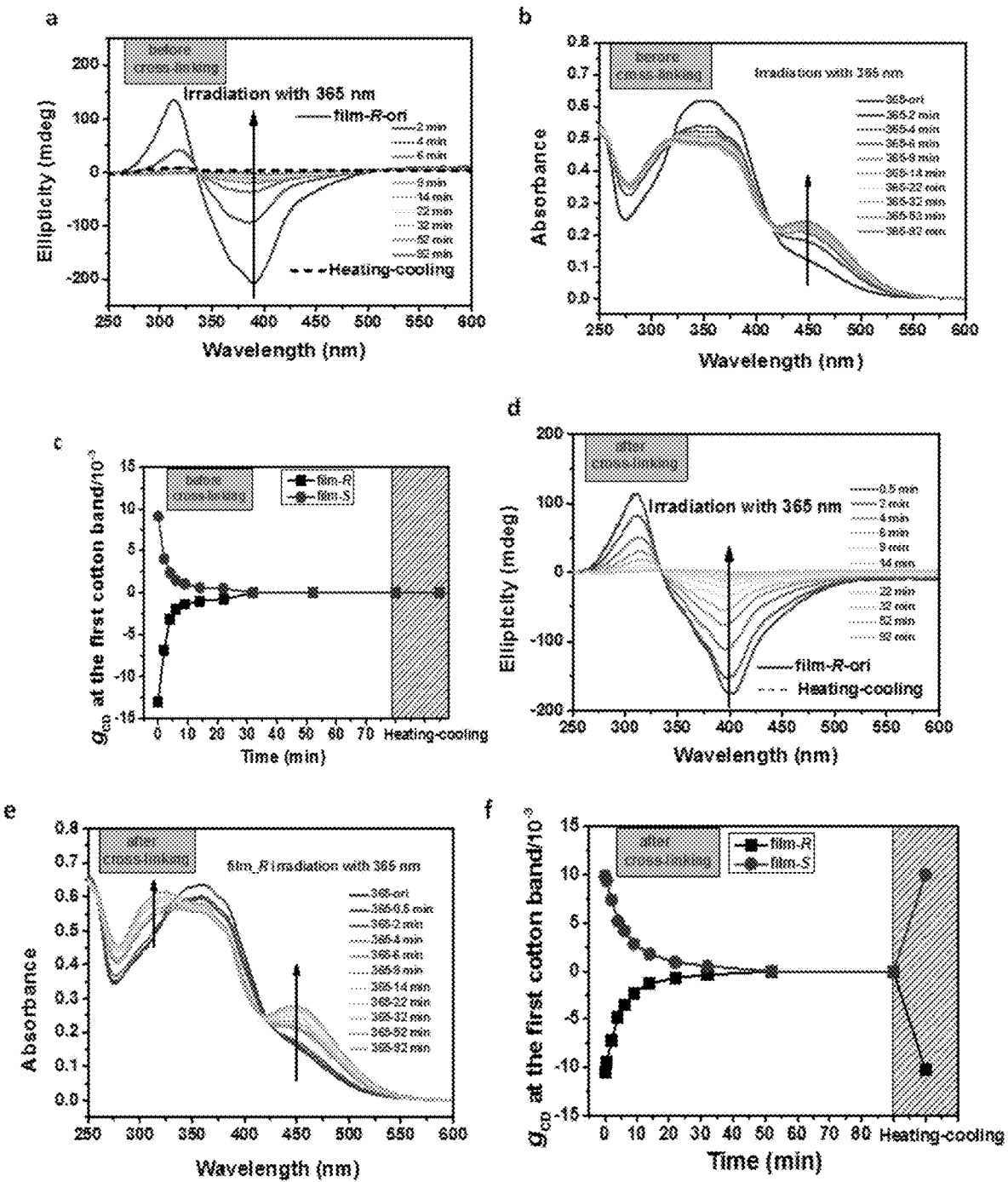
FIG. 13 shows the investigation of light resistance of copolymer $PAZ_1$-r-$AzOH_{0.62}$ chiral film before and after crosslinking.

FIG. 13 shows the investigation of light resistance of copolymer PAZ$_1$-r-AzOH$_{0.62}$ chiral film before and after crosslinking. It can be seen from the figure that the film before crosslinking can not recover after the CD signal was completely disappeared under 365 nm illumination because of no chiral source, while the film after crosslinking could still induce disordered parts through the internally ordered structure even without the chiral source, so that the disordered parts could form a chiral structure again, and the CD spectrum could recover to the original signal intensity. Under the same test, the CD spectra of $PAZ_1$-r-$AzOH_{0.19}$, $PAZ_1$-r-$AzOH_{0.25}$, $PAZ_1$-r-$AzOH_2$ showed varying degrees of reduction in recovery compared to their respective initial signal strengths.

Figure 14:
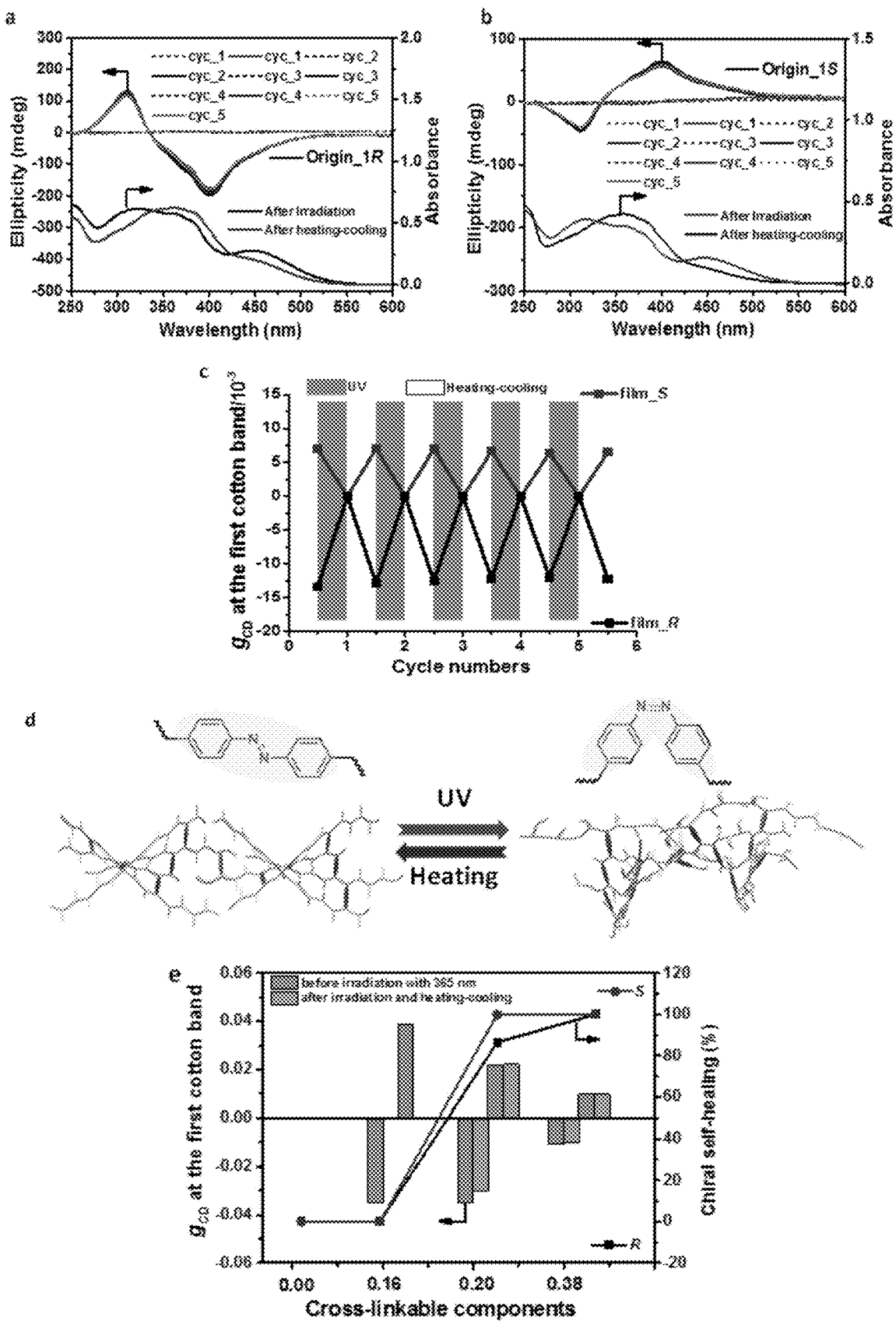
FIG. 14 shows the CD investigation of UV illumination and heating-cooling cycling of a crosslinked chiral film.

FIG. 14 shows the CD investigation of UV illumination (365 nm, 92 min) and heating-cooling cycling (20 s to room temperature after 100° C. temperature increase, 5 cycles) of a crosslinked chiral film;

FIG. 14 is a CD investigation of UV illumination (365 nm, 92 min) and heating-cooling cycle (increase the temperature to 100° C. for 20s and decrease it to room temperature, 5 cycles) of a crosslinked chiral film. It can be seen from the figure that the chiral film after crosslinking has good chiral self-healing properties.

Figure 15:
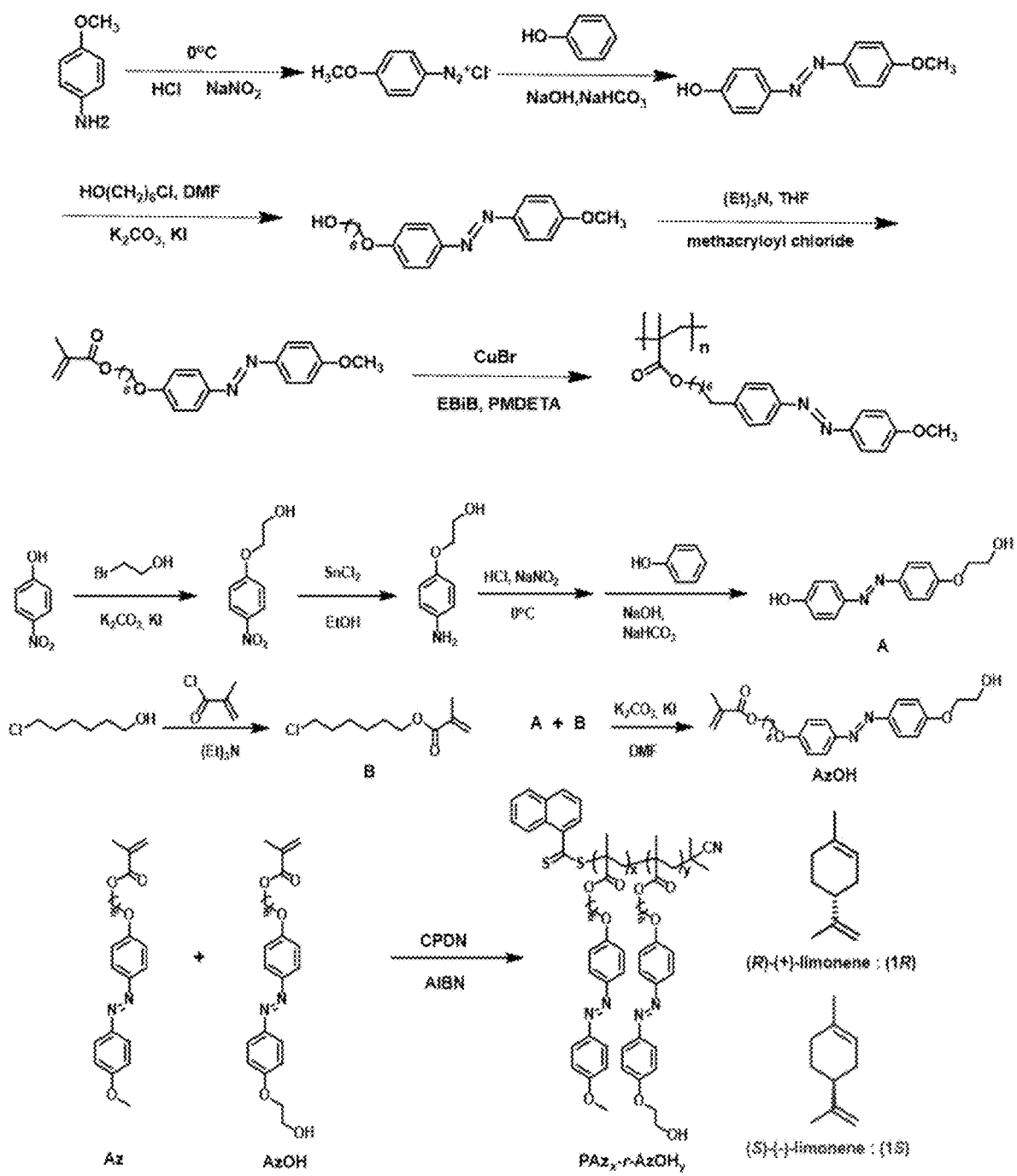
FIG. 15 is a schematic view of the preparation process of the present invention.

FIG. 15 is a schematic view of the preparation process of the present invention, which comprises the steps: first synthesizing an azobenzene random copolymer with a hydroxyl group at the end of a side chain by a series of organic synthesis reactions and RAFT polymerization, and investigating the molecular weight and liquid crystal properties of the polymer in detail by characterization means such as nuclear magnetism, gPC, DSC, POM and XRD; then, a polymer film is prepared by a spin coating mode, and chiral limonene vapor is selected to carry out chiral induction on the polymer film to obtain an optically active polymer film; the obtained chiral film is placed in the vapor environment of formaldehyde and hydrochloric acid for cross-linking reaction, so that the fixation of supramolecular chirality is realized, and the defects of instability and easy dissociation of the traditional assembly are overcome.

The invention claimed is:

1. A chiral azobenzene polymer crosslinked film, wherein a method of preparing the chiral azobenzene polymer crosslinked film comprises the following steps, preparing a side chain azobenzene polymer into a film; then, obtaining a chiral azobenzene polymer film through an induction of a chiral reagent; and then obtaining the chiral azobenzene polymer cross-linked film through a formaldehyde cross-linking; the side chain azobenzene polymer has the following chemical structure:

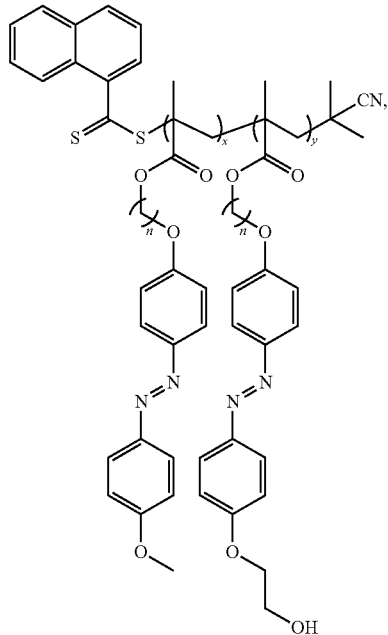

a ratio of x to y is 1 to (0.1-3), and n is 3-15.

2. The chiral azobenzene polymer crosslinked film according to claim 1, wherein a solution spin coating method is utilized to prepare the side chain azobenzene polymer into the film.

3. The chiral azobenzene polymer crosslinked film according to claim 2, wherein the spin coating comprises a low-speed spin-coating followed by a high-speed spin-coating.

4. The chiral azobenzene polymer crosslinked film according to claim 1, wherein the chiral azobenzene polymer film is obtained by adopting a chiral solvent thermal induction.

5. The chiral azobenzene polymer crosslinked film according to claim 4, wherein a chiral solvent of the chiral thermal induction is selected from the group consisting of chiral limonene, chiral carvone, chiral sec-butyl alcohol and chiral sec-octyl alcohol.

6. The chiral azobenzene polymer crosslinked film according to claim 1, wherein the formaldehyde crosslinking is carried out in the presence of hydrochloric acid.

7. The chiral azobenzene polymer crosslinked film according to claim 1, wherein the side chain azobenzene polymer is prepared from a monomer, a RAFT reagent and an initiator, wherein a molar ratio of the monomer to the RAFT reagent to the initiator is 50-500:3:1; the monomer is Az and AzOH.

8. The chiral azobenzene polymer crosslinked film according to claim 1, wherein a molar ratio of Az to AzOH is (0.1-10) to 1.

* * * * *